United States Patent Office

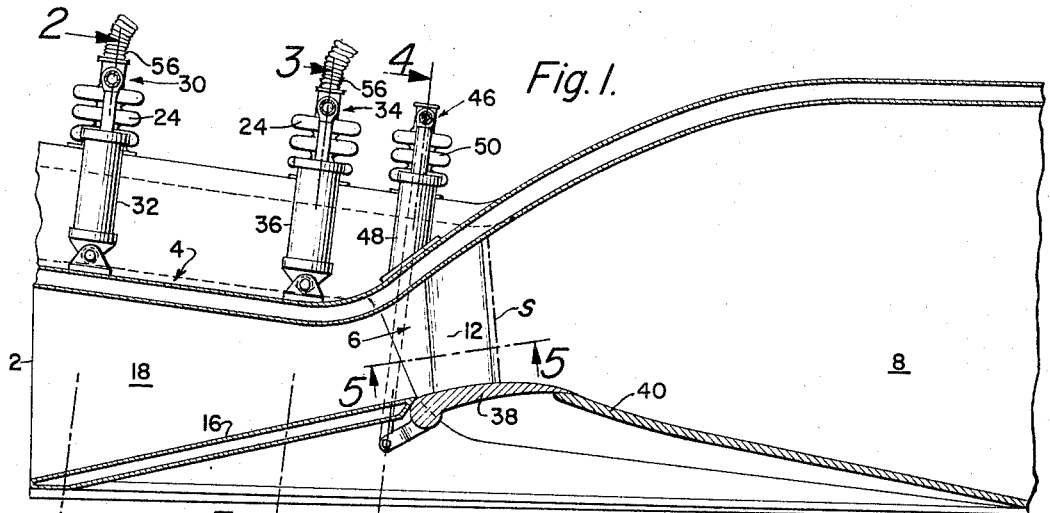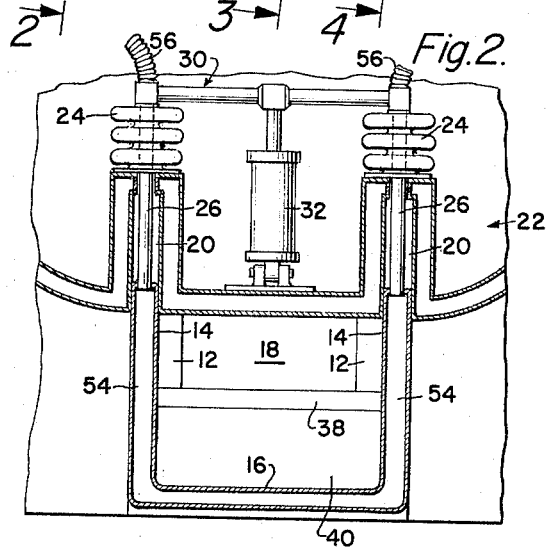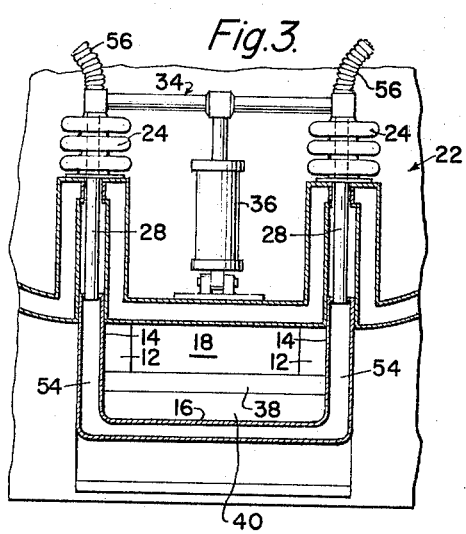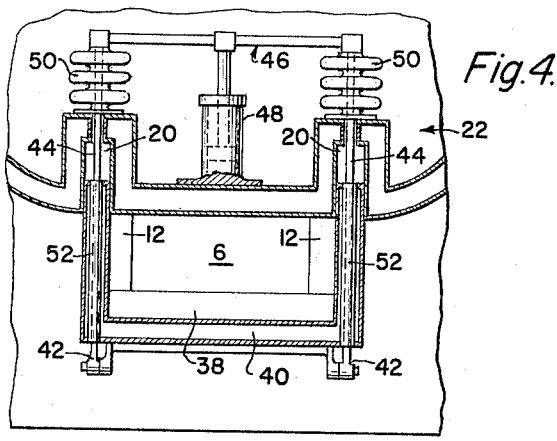

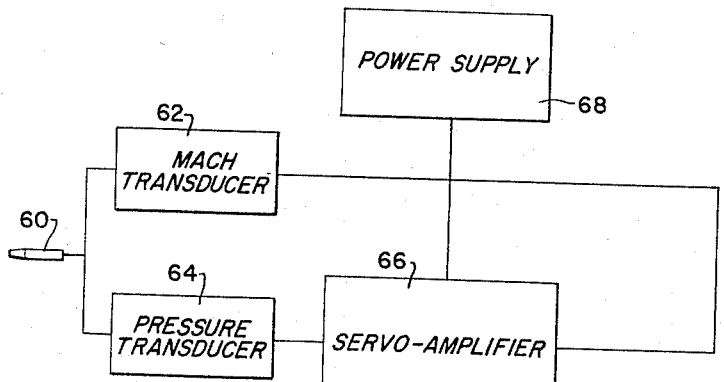
Fig.6.
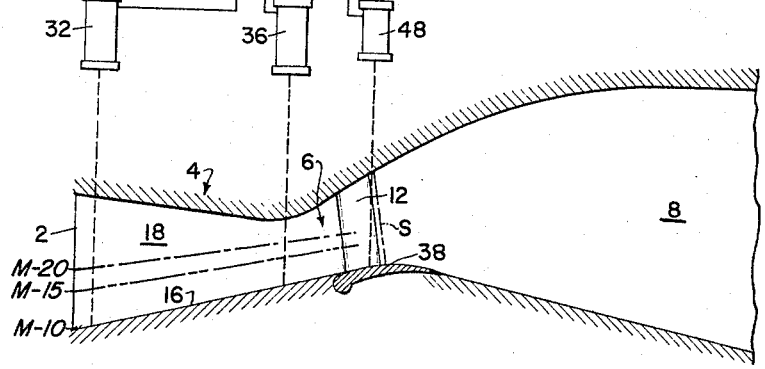
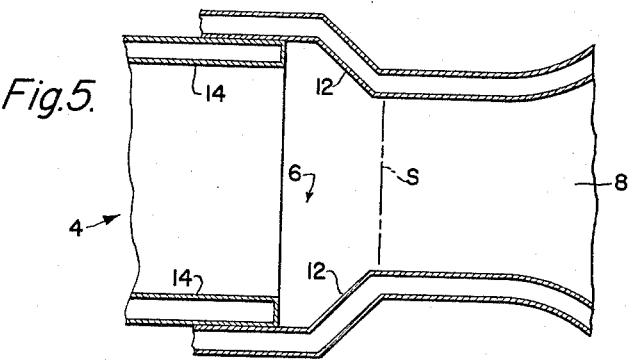
Fig.5.
INVENTOR:
JAMES E. CHAPMAN,
BY
Agent.

3,279,194
Patented Oct. 18, 1966

3,279,194
AEROTHERMODYNAMIC DUCT AND CONTROL MEANS THEREFOR
James E. Chapman, Palos Verdes Peninsula, Calif., assignor to The Garrett Corporation, Los Angeles, Calif., a corporation of California
Filed Aug. 14, 1962, Ser. No. 216,910
3 Claims. (Cl. 60—270)

The present invention relates to propulsive apparatus of the type in which continuous detonation of a supersonically fluent combustible mixture is sustained by an aerodynamically induced static temperature rise across a standing shock wave therein and, more particularly, to means for stabilizing the operation of such apparatus throughout a relatively wide range of variation in Mach number and other aerodynamic conditions occurring at the inlet region thereof.

It is known in the art to sustain combustion under conditions of hypersonic free-stream Mach number by utilizing the static temperature rise across a strong shock wave to excite continuous detonation of a fuel-air mixture, an exemplary discussion of this mode of combustion being set forth in "A Study of Supersonic Combustion" by Robert A. Gross and Wallace Chinitz, in the Journal of the Aero-Space Sciences, July 1960, pp. 521–524. In order to adapt the phenomenon of continuous detonation to propulsive use, as in a vehicular power plant, however, certain practical difficulties must be overcome. One such difficulty for which the teachings of the prior art offer no satisfactory solution relates to maintaining the stability of a continuous detonation process throughout substantial variations in ambient aerodynamic flow conditions, such as changes in atmospheric temperature, pressure, density, or Mach number. It is a primary aim of the present invention, therefore, to provide geometrically variable means for promoting the positional and thermodynamic stability of a standing detonation wave in an aerothermodynamic duct throughout relatively wide variation in free-stream Mach number and other aerodynamic conditions affecting the flow of ambient air therethrough.

In order to establish and maintain a propulsive detonation process of the type described, combustion-sustaining ambient fluid, for example, air, may be hypersonically induced into an aerothermodynamic duct and mixed therein in suitable proportion with an appropriate fuel such as hydrogen, the static temperature of the resulting flow being progressively increased, as by incremental compression across a series of shock waves, until the ignition temperature of the fuel is attained. The combustion that is ultimately excited across the shock wave in which the static temperature of the fluent mixture exceeds the ignition temperature thereof is substantially instantaneous and of negligible extension in flow direction.

Though an aerothermodynamic duct may be suitably dimensioned for sustaining the described process under a substantially constant condition of relative airflow, any deviation from such condition will tend to disturb both the aerodynamic and positional stability of the critical shock wave whereby detonation is excited and may seriously detract from, or even destroy the propulsive efficiency of the apparatus. In most of the detonative aerothermodynamic ducts proposed in the prior art this tendency to unstable operation under conditions of variable airflow is largely attributable to the relationship between the aerodynamic and the geometrical properties of the duct, the latter generally being a fixed or invariant feature of design. In such duct, the aerodynamic compression of induced air which precedes the desired standing shock wave and establishes the requisite conditions of temperature and pressure for sustaining detonation therein generally depends upon the establishment of a system of interrelated oblique shock waves, the geometry of which varies as a function of free-stream Mach number. Thus, the propulsive efficiency of the duct is dependent upon free-stream Mach number and, where the duct is used as a vehicular prime mover, free-stream Mach number depends upon the propulsive efficiency of the duct; as will be apparent to those skilled in the art, such an interdependence is not readily compatible with the maintenance of stable operation. It is an object of the present invention to overcome this, as well as other difficulties associated with propulsive apparatus of the type described, by providing a hypersonic aerothermodynamic duct for detonative combustion of fuel-air mixture wherein compression of the induced air may be varied in accordance with changes in the aerodynamic condition thereof.

It is another object of the invention to provide a propulsive aerothermodynamic duct for continuous detonation of fuel-air mixture that is operable throughout a wide range of super- and hypersonic Mach numbers.

It is another object of the invention to provide an aerothermodynamic duct having a geometrically variable inlet diffuser for maintaining a desired aerodynamic condition in a combustion portion of said duct throughout a wide range of variation in the aerodynamic conditions externally thereof.

It is still another object of the invention to provide an aerothermodynamic duct having a diffuser the inlet and outlet dimensions of which may be varied independently of each other.

It is another object of the invention to provide an aerothermodynamic duct having an inlet diffuser the dimensions of which may be varied in response to measured aerodynamic conditions.

It is another object of the invention to provide means for varying the dimensions of an aerothermodynamic duct in accordance with measured aerodynamic conditions so as to maintain a desired condition in a portion of said duct despite variations in the measured conditions.

The manner in which these as well as other objects and advantages of the invention are achieved will be made apparent to those skilled in the art by the following particular description of a preferred practice thereof, reference being had to the appended drawings of an exemplary embodiment of the invention. In the drawings, which are merely illustrative and not to be construed by way of limitation, and in which like features and elements are denoted by like reference characters:

FIG. 1 is a longitudinal section of an aerothermodynamic duct embodying the invention;

FIG. 2 is a cross section taken along the line 2—2 of FIG. 1;

FIG. 3 is a cross section taken along the line 3—3 of FIG. 1;

FIG. 4 is a cross section taken along the line 4—4 of FIG. 1;

FIG. 5 is a cross section taken along the line 5—5 of FIG. 1; and

FIG. 6 is a diagram illustrating means for controlling a variable inlet diffuser as shown in FIG. 1.

Referring to FIG. 1 there is shown an aerothermodynamic duct for operation at hypersonic free-stream Mach number which includes an inlet 2, a diffuser 4, a combustion space or throat 6 and an exhaust nozzle 8, the duct being mounted on a suitable vehicle (not shown) and so disposed relative thereto as to induce ambient fluid at the inlet 2 for exothermic reaction with fuel which may be introduced by means of suitable injection nozzles (not shown) the heated reaction product being expanded in the exhaust nozzle 8 and expelled rearwardly of the duct for imparting propulsive thrust to the associated vehicle. Where such a duct is to be operated in air, the fuel of choice for combustion therein is hydrogen, sustained detonation of which may be excited at a static temperature of approximately 1610° R. and a static pressure of approximately 4200 pounds per square foot. In order to maintain the desired operating cycle, the static pressure and temperature of air hypersonically induced at the inlet 2 are preferably raised by compression in the diffuser 4 to values approximating those at which combustion of the fuel introduced by the injection nozzles may be excited. In consequence of the compression effected by the diffuser 4, the Mach number of the fluent mixture of fuel and air is reduced from the hypersonic value prevailing at the inlet 2 to some lesser, supersonic value (i.e. $M>1.0$) as it enters the combustion space 6. In the combustion space oppositely disposed wedges or ramps 12 serve to excite a strong shock wave, indicated by dashed line S, across which there occurs an abrupt rise in static temperature sufficient to cause ignition of the fuel air mixture therein, the resulting combustion process being substantially instantaneous and of negligible thickness in flow direction.

It is to be understood that the establishment of a precise temperature immediately upstream of the combustion space 6 is not critical to the described mode of operation of the duct, and the temperature in this region may, in fact, be slightly below or even slightly above the ignition temperature of the fuel air mixture. In the latter circumstance there will be some tendency for normal (i.e. non-detonative) combustion to be excited before the mixture encounters the abrupt temperature rise which characterizes the shock wave whereby the desired detonative mode of combustion is sustained; the speed of propagation of non-detonative combustion is so slow, however, compared to the velocity at which the fluent mixture traverses the detonation-exciting shock wave S that the undesired and propulsively ineffective mode of combustion is immediately superseded by the desired detonative mode, the speed of propagation of which is, by comparison, substantially instantaneous.

By analogy with the process of intermittent detonation as observed, for example, in heat engines operating according to the Otto cycle, the described mode of combustion has come to be referred to as sustained or standing wave detonation, and the shock wave in or immediately proximate to which such combustion occurs has been referred to in the literature of the art, and will accordingly hereinafter be referred to, as a detonation wave.

In order to maintain a detonation wave of the type described in a desired position in the throat or combustion space 6 of the duct shown in FIG. 1, conditions of static temperature and pressure favorable thereto must be established by compression of the induced air in the diffuser 4 and, collaterally, the mass flow therein must be maintained in suitable proportion to the cross-sectional area of the combustion space. Thus, establishment of the requisite aerodynamic conditions for sustaining a propulsive detonation wave depends upon the Mach number and static pressure prevailing at the inlet 2 and upon the degree of compression effected in the diffuser 4, the latter being itself a function of inlet Mach number and static pressure and the change in flow cross-sectional area due to convergence of the diffuser walls. As will be readily apparent, therefore, an aerothermodynamic duct that is of fixed dimensions throughout may be adapted to sustain a propulsive detonation wave only within a narrowly limited range of free-stream Mach number and static pressure wherein the diffuser and throat are suitably proportioned relative to each other and to the ambient air flow at the inlet. Accordingly, the present invention provides means for varying both the inlet and outlet dimensions of the diffuser 4 in accordance with measured aerodynamic conditions.

As shown in the drawing, the diffuser 4 includes spaced side walls 14, interconnected by bottom wall 16 to define a longitudinally disposed, converging flow passage 18, the walls 14 being slidably received in suitable recesses 20 formed in vehicle envelope 22. The envelope 22 is sealably apertured, for example, by means of flexible bellows as at 24, to accommodate movement of forward side wall support shafts 26 and rear support shafts 28 for controlling the position of bottom wall 16. The support shafts 26 are operatively connected, as through a bridge 30 to an actuator 32 whereby the forward portion of wall 16 may be lowered or raised to increase or decrease the diffuser intake area. Similarly, the support shafts 28 are operatively connected through a bridge 34 to a second actuator 36 whereby the rearward portion of the wall 16 may be moved independently of the forward portion thereof for varying the diffuser exit area. Thus, by appropriate operation of the actuators 32, 36 the inlet and outlet areas of the diffuser may be adjusted independently of each other and the effective compression ratio of the diffuser may be varied in accordance with changes in aerodynamic conditions affecting the operation of the duct.

In order to provide an aerodynamically continuous transition from the diffuser bottom wall 16 to the exhaust nozzle 8 a fairing 38 is pivotally connected with the wall 16 and urged into overlapping engagement with surface 40 of the exit nozzle. For the latter purpose, the fairing 38 may be operatively connected, as through extensions 42, linkage rods 44 and a bridge 46 with an actuator 48 housed internally of the vehicle movement of the linkage rods 44 relative to the envelope 22 and side walls 14 being accommodated through flexible bellows seals 50 and tubular passages 52 respectively.

In a preferred embodiment of the invention, vehicle envelope 22 and diffuser walls 14 and 16 may be of duplex construction, as shown, to define intermural spaces 54 for circulation of fluid coolant therethrough, and for this purpose the diffuser support shafts 26, 28 may be of tubular form to provide inlet and outlet paths for connection, as through flexible conduits 56 with a source of coolant (not shown) contained internally of the vehicle. If the fuel used is one that may be stored under cryogenic conditions, it may be thermodynamically advantageous to utilize such fuel as a coolant. For example, hydrogen cryogenically stored for use as fuel may be circulated in fluid phase through the intermural spaces 54 and used for coolant purposes before being introduced into the duct for combustion therein. Thus, heat of compression and combustion which may be rejected to the walls of the duct as a result of the aerothermodynamic processes taking place therein may be effectively dissipated for maintaining such walls within a structurally desirable temperature range, and, at the same time, the fuel may be raised to a favorable temperature for admixture with the induced air flow.

FIG. 6 schematically illustrates exemplary means for controlling the dimensions of the diffuser 4 in accordance with measured aerodynamic conditions affecting the maintenance and stability of a standing detonation wave in the combustion space 6. A probe 60 is projected into the ambinet atmosphere for sensing Mach number and static pressure therein, signals indicative of the values of these conditions being developed by suitable transducer means 62 and 64 for application to a servo-amplifier 66 whereby the flow of power from a source or supply 68 to the actuators 32, 36 and 48 may be controlled in accordance with the operating requirement of the aerothermodynamic duct and the aerodynamic conditions sensed by the probe 60. As the Mach number increases, appropriately metered application of power to actuators 32 and 36 will cause the inlet and exit areas of the diffuser 4 to be proportionately decreased, the actuator 48 being collaterally energized to assure that the internal surface continuity of the duct is maintained by suitably positioning the fairing 38. Similarly, as the Mach number decreases, power will be applied to actuators 32 and 36 in opposite sense so as to increase the inlet and exit areas of the diffuser 4 in proportion to the measured change in Mach number. In the drawing an exemplary duct configuration suitable for operation at Mach 10 and an ambient static air pressure of approximately nine pounds per square foot is indicated by solid lines, corresponding configuration suitable for operation at the same static pressure and at Mach 15 and Mach 20 being indicated by dashed lines.

In connection with the foregoing description it is to be understood, of course, that the probe 60, the transducers 62 and 64, the servo-amplifier 66, the power supply 68, and the actuators 32, 36 and 48 may be of any well known construction suited to the requirements and operating circumstances of a particular embodiment of the invention. Thus, pressure and Mach number values sensed by the probe 60 may be converted by the transducers 62 and 64 to proportional electrical signals, which may embody desired scale or other corrective factors, for application to the servo-amplifier 66 which may, in turn, be adapted to control the flow of hydraulic or pneumatic fluid under pressure from the supply 68 to actuators 32, 36 and 48. Other arrangements utilizing electrical, pneumatic or hydraulic energy for signal development and transmission or for control force application may of course be used, and it is anticipated that those skilled in the art may devise control system arrangements based on various combinations of such energy and signal sources for use in conjunction with particular practices of the invention.

Though the present invention has been disclosed herein with particular reference to a preferred embodiment thereof, it is anticipated that those skilled in the art will have occasion to devise numerous variations thereon and it is my desire that all such variations falling within the spirit and scope of the invention be secured to me by Letters Patent.

What is claimed is:

1. A reaction propulsion engine comprising:
   an aerothermodynamic duct for sustaining detonation of a fuel-air mixture under conditions of supersonic ambient air flow relative to the duct, said duct having a forward inlet for inducing flow of ambient air into the duct, a rear exhaust nozzle, a rearwardly convergent diffuser passage between said inlet and nozzle for supersonically compressing the entering air, and a combustion space between said diffuser and nozzle;
   said duct including a rigid, longitudinally extending wall defining one longitudinally extending side of and extending substantially the full length of said diffuser passage, the ends of said wall being independently adjustable toward and away from the opposing wall of said duct to selectively vary the angle between said adjustable wall and said opposing wall and thereby the rearward convergence angle of said passage; and
   first means on said duct operatively connected to one end of said adjustable wall and second means on said duct operatively connected to the other end of said adjustable wall for independently positioning the ends of the latter wall relative to said opposing wall and thereby angularly positioning said angularly adjustable wall.

2. A reaction propulsion engine comprising:
   an aerothermodynamic duct for sustaining detonation of a fuel-air mixture under conditions of supersonic ambient air flow relative to the duct, said duct having a forward inlet for inducing flow of ambient air into the duct, a rear exhaust nozzle, a rearwardly convergent diffuser passage between said inlet and nozzle for supersonically compressing the entering air, and a combustion space between said diffuser and nozzle;
   said duct including a rigid, longitudinally extending wall defining one longitudinally extending side of and extending substantially the full length of said diffuser passage, the ends of said wall being independently adjustable toward and away from the opposing wall of said duct to selectively vary the angle and the spacing between said walls and thereby the inlet and outlet areas and the rearward convergence angle of said passage; and
   first means on said duct operatively connected to one end of said adjustable wall and second means on said duct operatively connected to the other end of said adjustable wall for independently positioning the ends of the latter wall relative to said opposing wall.

3. A reaction propulsion engine comprising:
   an aerothermodynamic duct for sustaining detonation of a fuel-air mixture under conditions of supersonic ambient air flow relative to the duct, said duct having a forward inlet for inducing flow of ambient air into the duct, a rear exhaust nozzle, a rearwardly convergent diffuser passage between said inlet and nozzle for supersonically compressing the entering air, and a combustion space between said diffuser and nozzle;
   said duct including a rigid, longitudinally extending wall defining one longitudinally extending side of and extending substantially the full length of said diffuser passage, the ends of said wall being independently adjustable toward and away from the opposing wall of said duct to selectively vary the spacing between said adjustable wall and said opposing wall and thereby the inlet and outlet areas of said passage; and
   first means on said duct operatively connected to one end of said adjustable wall and second means on said duct operatively connected to the other end of said adjustable wall for independently positioning the ends of the latter wall relative to said opposing wall.

References Cited by the Examiner

UNITED STATES PATENTS

| | | | |
|---|---|---|---|
| 2,858,668 | 11/1958 | Kelley et al. | 60—35.6 |
| 2,987,878 | 6/1961 | Bogert | 60—35.6 |
| 2,997,843 | 8/1961 | Arnett et al. | 60—35.6 |
| 3,040,516 | 6/1962 | Brees | 60—35.6 |
| 3,054,256 | 9/1962 | Minos | 60—35.6 |
| 3,129,910 | 4/1964 | Smith | 244—53.8 |

FOREIGN PATENTS 631,058   11/1961   Canada.

MARK NEWMAN, *Primary Examiner.*

ABRAM BLUM, *Examiner.*

W. A. SCHUETZ, R. D. BLAKESLEE,
*Assistant Examiners.*